Aug. 19, 1924.  H. PODOLSKY  1,505,602
DOUGH DROPPER
Filed Jan. 24, 1922
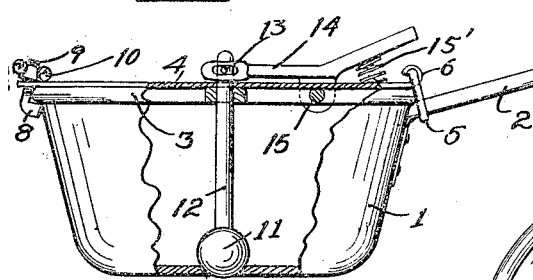
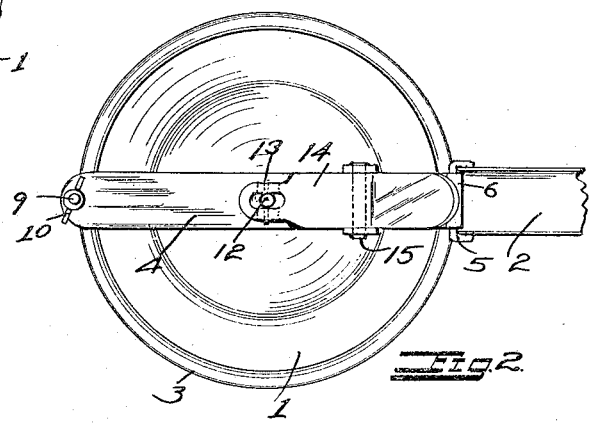
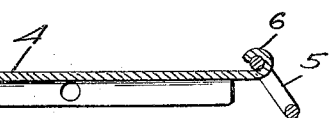
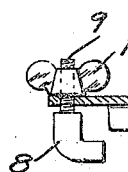
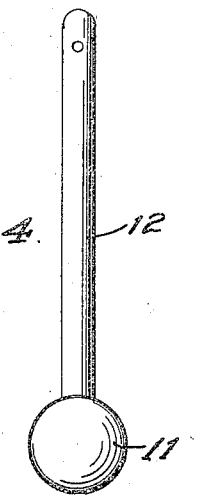
INVENTOR
Henry Podolsky
BY
Carlos P. Griffin
ATTORNEY.

Patented Aug. 19, 1924.

1,505,602

UNITED STATES PATENT OFFICE.

HENRY PODOLSKY, OF SAN FRANCISCO, CALIFORNIA.

DOUGH DROPPER.

Application filed January 24, 1922. Serial No. 531,368.

*To all whom it may concern:*

Be it known that I, HENRY PODOLSKY, a citizen of the United States, residing at San Francisco, in the county of San Francisco, State of California, have invented a new and useful Dough Dropper, of which the following is a specification in such full and clear terms as will enable those skilled in the art to construct and use the same.

This invention relates to a dropper for dropping pancake dough or other material of that kind in small quantities, and an object of the invention is to provide a device which may be detachably applied to the pan used for carrying the dough in order that the dough dropping mechanism may be removed from the pan whenever it is desired to clean the same.

It will also be observed that it is an advantage to have the dropping mechanism removable since should the pan wear out or become destroyed, the dropping mechanism may be applied to other pans by simply making a hole in the bottom of the pan to receive the valve.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of the pan to which the dropper is applied, a portion of the pan being cut away and the dropper being shown in section to improve the illustration.

Fig. 2 is a plan view of the pan and dropping device.

Fig. 3 is a vertical sectional view of the bar carrying the dropping device, and Fig. 4 is a side elevation of the valve alone removed from the dropping mechanism.

The numeral 1 indicates an ordinary form of pan which has a handle 2. Such pans are usually provided with a rolled edge at 3, which rolled edge is made use of in the present invention for the purpose of holding the dropping mechanism in place.

The dropping mechanism consists of a channel bar 4. This bar has its end rolled over a flat link 5 as shown at 6. At the center it has a bearing 7 riveted thereto, while at its opposite end it has an L-shaped hook 8 with a threaded shank 9, which threaded shank carries a wing nut 10.

The valve consists of a ball 11 on the end of the valve stem 12. The valve stem passes through the bearing 7 and it has a pin 13 which extends through the slots in one end of the lifting lever 14.

The lever 14 is pivotally mounted at 15 on the bar 4. The back end of the lever 14 is extended to a convenient position for the use of the operator when he grasps the handle 2, and a spiral spring 15′ causes the valve to be normally held in the position shown in Figure 1 with sufficient force to prevent leakage.

The device is applied to the sauce-pan by placing the ring 5 over the handle and then tightening the hook 8 against the rolled rim of the pan. In use the batter or other material is placed in the pan, and the valve 11 is lifted from time to time as separate quantities of dough are to be dropped from the pan.

What I claim is as follows, but various modifications may be made in the construction shown in the drawings and above particularly described form, within the purview of my invention.

In a dough dropper a handled receptacle, a cross bar having a link at one end to pass over the handle and having a hook at the other end to secure the cross bar to the receptacle, a valve carried by the cross bar to close an opening in the bottom of the receptacle, and a lever for raising the valve from time to time.

In testimony whereof I have hereunto set my hand this 14th day of January A. D. 1922.

HENRY PODOLSKY.